April 2, 1968 F. D. JOESTING 3,375,721
SYSTEM FOR FAST FLUID PRESSURE SCANNING
Filed Sept. 1, 1965

INVENTOR.
FREDERICK D. JOESTING
BY Alfred N. Feldman
ATTORNEY

United States Patent Office 3,375,721
Patented Apr. 2, 1968

3,375,721
SYSTEM FOR FAST FLUID PRESSURE SCANNING
Frederick D. Joesting, Park Ridge, Ill., assignor to Honeywell Inc., Minneapolis, Minn., a corporation of Delaware
Filed Sept. 1, 1965, Ser. No. 484,220
5 Claims. (Cl. 73—420)

ABSTRACT OF THE DISCLOSURE

A system for rapid, sequential scanning of a plurality of variable sensors that does not require stabilization of the scanned pressure prior to readout.

---

The present invention is directed to a system for rapidly scanning various fluid pressure systems to measure the pressures contained in those systems. The present invention is more particularly adapted to rapid scanning of pneumatic temperature control systems from a remote location.

In the temperature control art, it has become very desirable to obtain remote readout or indication of the condition of temperature control systems throughout buildings or general locations in which they are installed. In electric systems, this can be readily and rapidly accomplished by conventional electric sensing. In pneumatic temperature control systems, this problem is more complex. The sensing of pneumatic pressures at remote locations creates a problem of varying response times depending on the length, size, resistance, volume and other characteristics of the connection between the system and the readout point because of the time required for the pressure in the readout connection to stabilize. This problem can be partially overcome by the conventional method of supplying a separate pressure gauge for each of the lines, but this becomes a very cumbersome, cluttered, and expensive expedient.

The present invention is directed to a simplified method of scanning fluid systems, more particularly pneumatic systems, with the use of a single readout device that is switched from one system to another, but which provides a rapid or almost immediate reading that is representative of the pressure in the selected fluid or pneumatic system. The present advantage is accomplished by utilizing a pressure readout means which in effect is a pneumatic computer that computes the pressure at the remote pneumatic system based on a pressure and volume consideration which is characteristic of the particular system involved.

The present invention will be specifically disclosed as reading pneumatic pressures in a group of temperature control systems at remote locations by means of a single readout device which rapidly computes a representative pressure that can be indicated as a temperature in the remote system. This arrangement is disclosed and described in a semi-schematic form in FIGURE 1, and FIGURE 2 discloses a modification of the system in which a special case of the computer is disclosed.

Figure 1:
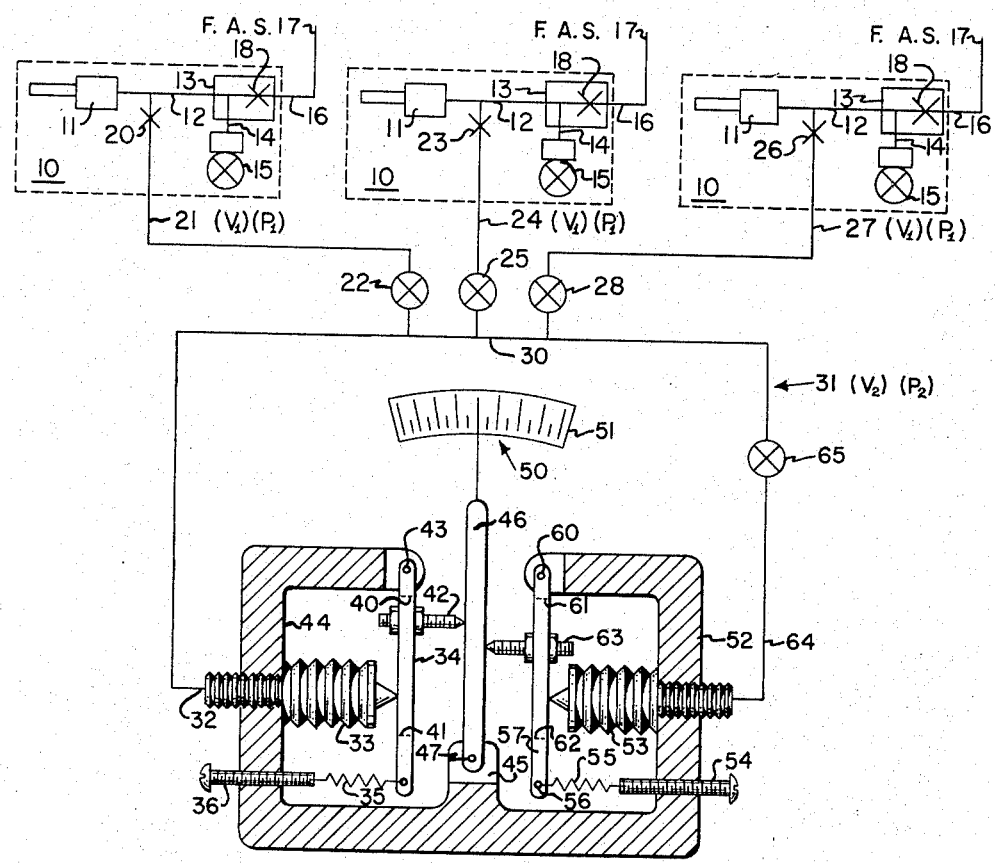

In FIGURE 1 there is disclosed a group of three fluid pressure operated systems or pneumatic control systems 10, each being identical. Each of the pneumatic control systems 10 includes a sensor 11 connected by pipe 12 to a controller or relay 13. The controller or relay 13 in turn is connected by pipe 14 to a valve or damper 15. The relay or controller 13 is connected to a pipe 16 that is in turn fed by a filtered air supply 17. In each case the relay is fed through a restriction 18. All three of the disclosed systems 10 are identical and have been numbered identically. These systems are well known pneumatic temperature control systems, and it is desirable to determine the temperature being controlled at each of the systems. This can be accomplished by determining the pressure on pipe 12 of each of the systems. This could be readily accomplished by connecting a pressure gauge calibrated in temperature to each of the pipes, but would entail a complex and costly arrangement for remote readout. The present invention overcomes this deficiency by the expedient that will be described below. It will be understood that the pipe 12 thereby contains a varying pressure output that is a function of temperature or some other condition being sensed in the system and the type of system and its components are not material to the present invention. It is merely necessary that some type of pressure output of a varying nature be supplied in pipe 12 and that a readout or sensing of this pressure is desired.

In the disclosure of FIGURE 1, the left most pipe 12 is connected through a restriction 20 to a pipe or fluid connection means 21 to a valve means 22. The center system pipe 12 is connected through a similar restriction 23 to a fluid connection means or pipe 24 to a valve means 25. The right most system pipe 12 is connected through a restriction 26 to a fluid pipe connection means or pipe 27 and a valve means 28. In each case the restrictions, fluid connection means or pipes, and valves, are identical equipment of a conventional nature. The valves 22, 25, and 28, may be either hand operated, pneumatically operated, or solenoid operated valves, as is convenient for the operation of a particular installation.

All of the valves 22, 25, and 28 are connected to a common pipe 30 of a pressure readout means generally disclosed at 31. The pressure readout means 31 has the pipe 30 connected at 32 to a pressure responsive means or bellows 33 that bears against a lever 34. The lever 34 is spring loaded at 35 to an adjustment screw 36 so that the lever 34 at a point off center of the slot so as to apply sure responsive means or bellows 33. The lever 34 is slotted between the end points 40 and 41 to provide a slot or channel for an adjustable pivot 42 that can be moved between the ends 40 and 41 of the slot. The pressure responsive means or bellows 33 bears against the lever 34 at a point off center of the slot so as to apply a force to the lever 34 to cause the lever to rotate around a pivot means 43. The pivot means 43 is mounted on a frame 44 that also supports the pressure responsive means 33 and the adjusting screw 36. Mounted from the frame 44 at its center 45 is a pointer 46 that is pivoted at 47. The pointer 46 extends to an indicia means generally disclosed at 50 and which includes a scale 51 for the pointer 46 to register in correspondence with.

The frame 44 further has an extension 52 that supports a second pressure responsive means or bellows 53 and an adjusting screw 54 that mounts a spring 55 to the end 56 of a second lever 57. The second lever 57 is pivoted at 60 and has a slotted opening between points 61 and 62. The slotted opening between the points 61 and 62 supports and adjustable pivot point 63 that can be slid up and down for adjustment purposes. Once again the bellows 53 rides against the lever 57 at a point off-center of the slot so as to apply a bias to the lever 57. The bellows 53 is connected by means of a pipe 64 to a valve means 65 which in turn is connected to the pipe 30. The adjustments provided permit accurate calibration of the indicia means 50 for temperature, pressure or whatever else is being sensed.

In order to understand the operation of the overall device, the function of certain of the components will be explained. It should be noted that the pipes or connection means 21, 24 and 27 each contain a specific volume of air. This volume will be designated as $V_1$. It should be further understood that the pressure readout means 31 also contains a specific volume of air and this volume will be designated as $V_2$. In order to understand the device, only the operation of one of the systems 10 will be described because the other systems are identical to it. The connection means 21 contains a specific volume of air $V_1$ and it also contains a pressure designated as $P_1$ at any given time if the valve 22 is closed. The pressure $P_1$ in the pipe 21 will be the same as the pressure in pipe 12 and will follow that pressure as it changes. The restriction 20 is sized to permit the pressure to follow in all normal cases. It should be further understood that the pressure in the pressure readout means 31 also is of some finite value $P_2$ along with the previously defined volume $V_2$. At any time that the valve 22 is opened, the two volumes and two pressures are intermixed or are connected to one another. At this particular time a third pressure exists which can be referred to as $P_f$ and it will be obvious that the pressure $P_f$ exists in the combined volumes $V_1$ and $V_2$ of the pipe 21 and the pressure readout means 31. When the valve 22 has just been opened to connect the pipe 21 to the pressure readout means 31, the following equation for the pressures and volumes exists:

$$P_f(V_1+V_2)=P_1V_1+P_2V_2 \quad (1)$$

It is quite obvious that Equation 1 can be readily solved for $P_1$, which is the pressure existing in pipe 21. This equation then becomes:

$$P_1=\frac{P_f(V_1+V_2)}{V_1}-\frac{P_2V_2}{V_1} \quad (2)$$

This equation can be simplified to:

$$P_1=K_1P_f-K_2P_2 \quad (3)$$

The $K_1$ and $K_2$ are obviously constants which are functions of the volumes of the systems, and it thus becomes apparent that the pressure $P_1$ in pipe 21 is a function of the total volume of the system and the total pressure in the system, at the time valve 22 is open.

The pressure readout means 31 has been designed to solve Equation 3. Since the pressure readout means 31 solves this particular equation, it is apparent that it reads a pressure that is representative of the pressure in pipe 21. The pressure in pipe 21, is the pressure that is of interest. The present device therefore is capable of reading very rapidly a pressure in a remote line and computing along with the pressures and volumes contained, the pressure desired. This can be done for each of the systems 10. The method for obtaining this reading, or the operation of the system will be described below.

OPERATION

In operation of the system disclosed in FIGURE 1, the valves 22, 25, 28, and 65 would all be closed. At the time it was desired to read the representative pressure in any particular system 10, the following sequence would be utilized. It is assumed that the pressure in the left most system 10 is desired to be read and the following steps would accomplish this reading. The valve 65 would be opened and then closed. This establishes some definite pressure $P_2$ in the volume $V_2$ of the pressure readout means 31. The valve 22 would then be opened and closed. This would then perform the function of combining the volume $V_1$ and pressure $P_1$ of the line 21 to the system. The operation thus described would have established a pressure in the bellows 53 that was a function of the pressure in the pressure readout means 31 alone, while the opening and closing of the valve 22 would allow the pipe 30 to distribute the combined pressure of the two systems along with the combined volumes to the bellows 33 of the pressure readout means 31. The combined affects of the pressures in the bellows 33 and 53 would bear on the pointer 46 causing a readout on the indicia means 50 which was representative of the pressure contained in pipe 21, which in fact is a reading of the pressure in the pneumatic control system. In order to read the next pressure, it would only be necessary to open and close valve 65 re-establishing a reference pressure $P_2$. The appropriate valve 25 or 28 could then be opened and closed to give a substantially immediate reading of the pressure as an indication of temperature for either the center or the right-hand systems disclosed in the present device.

It thus becomes apparent that the present arrangement rapidly solves the formula established, and thereby gives a reading in the pressure readout means 31 that is representative of the actual pressure that exists in the varying pressure output lines 12 of the various systems 10. The present device therefore provides a rapid means of reading a series of remote pressures, without waiting for the overall system to stabilize at some value as would normally be required of switching between various pressurized systems.

It should be understood that in order to utilize the device as disclosed in FIGURE 1, the total volume of the lines 21, 24, and 27 should be identical. This can be readily accomplished by adding pneumatic tubing to the shorter lines when being run to the pressure readout means 31 or can be accomplished by adding fixed volumes to the lines in order to provide an equal volume in each of the lines. If the volumes are not equal, the pressure readout means 31 will give a readout pressure on indicia means 50 which is not necessarily accurate unless the reading is interpreted with respect to the total volume in the system. This can also be readily accomplished by calibrating the system initially so that various readings for each system will have a specific meaning dependent upon the volume of the pipes 21, 24, or 27.

The restrictions 20, 23, and 26 have been utilized in order to isolate the fluid systems 10 from the possible "bumps" or reaction of the use of the pressure readout means 31. The use of the restrictions 20, 23, and 26 is not essential, but prevents the fluid systems 10 from being upset from their normal condition during the readout period. The use of these restrictions is therefore desirable, but not essential.

In summary, the very basic conditions before, during, and after reading the pressures is as follows. Before switching, the pressure in line 21 represents temperature (or some other condition) and is referred to as $P_1$. The indicia means 50 is used to ultimately show this temperature by corresponding to pressure $P_1$. After opening and closing valve 65, along with the valve 22, $P_1$ changes (to be lower, if $P_2$ was lower than $P_1$, or to be higher, if $P_2$ was higher than $P_1$). This resultant pressure is $P_f$ and exists in line 30. As the pressure in line 21 ($P_1$) changes to $P_f$ due to the opening of valve 22, the controller 13 either starts to feed or bleed air to restore the pressure to $P_1$. For this reason, valve 22 needs to be opened and closed. If valve 22 were left open, $P_f$ would eventually change to $P_1$, and the readout of indicia means 50 would move away from the correct value. By the combining of $P_1$, $V_1$ and $P_2$, the establishment of $V_2$ is fast and little air is either fed or bled in the system. An equalization of pressures is all that exists and therefore, it is practical to open and close valve 22 without very exact timing without upsetting the accuracy of the device.

Figure 2:
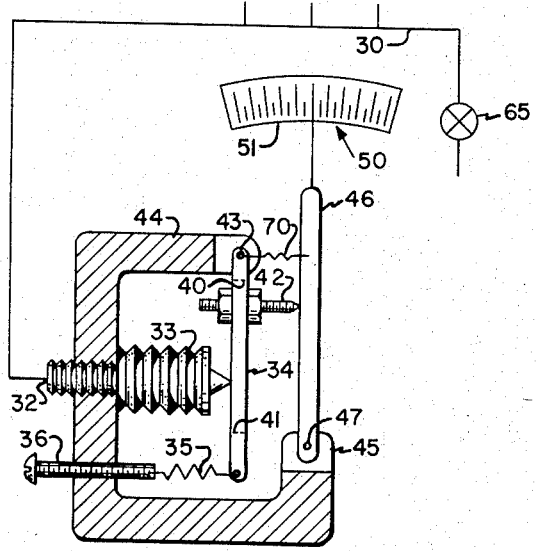

The present invention can be simplified as disclosed in FIGURE 2. In FIGURE 2 one-half of the pressure readout means has been eliminated, as well as, has been the connecting pipe 64 of FIGURE 1. This arrangement utilizes the atmosphere as one of the values in each of the steps of operation. The device disclosed in FIGURE 2 is substantially the same as one-half of that used in FIGURE 1 except for the addition of a spring 70 between the pivot 43 and the pointer 46. The spring 70 holds the pointer 46 in contact with the bellows 33 thereby keeping the device in operation. The operation of the system disclosed in FIGURE 2 is substantially the same as in FIGURE 1. The valve 65 is opened to the atmosphere. This establishes a reference point for the system. The valve 65 is then closed, and the appropriate valve 22, 25, or 28 is temporarily opened and then closed. This establishes the pressure $P_f$ in the pressure readout means 31. The arrangement thereby gives a reading wherein the Equation 3 is utilized by the value $P_2$ or the pressure in the pressure readout means 31 has been made a constant. This constant is taken care of in the calibration of the indicia means 50, thereby the system could be operated in the disclosure of FIGURE 2. This disclosure would utilize slightly more air than the system as disclosed in FIGURE 1, but it would have the advantage of eliminating part of the structure involving the bellows 53 and the pipe 64. The use of the atmosphere as a reference therefore is only a special case, and is not a different invention from that disclosed in FIGURE 1.

The present invention can be practiced by the use of many different types of pneumatic computing devices. The main concept in the present invention is the recognition that it is possible to compute at a pressure readout means 31 the apparent pressure in a remote system. The means for obtaining this could be accomplished with various types of computers and the applicant therefore wishes to be limited in the scope of his invention solely by the appended claims.

What is claimed is:

1. A system for fast scanning of fluid pressures, comprising:
    a plurality of fluid systems each having an independently varying pressure output to be scanned;
    separate connection means for each fluid system to transmit said independently varying pressure;
    and pressure readout means commonly connected to said separate connection means, said pressure readout means including
        indicia means to indicate a pressure applied to said pressure readout means;
        operating volume means;
        reference volume means connected to said operating volume means by valve means, said valve means being opened to allow the existing pressures in said operating volume means and said reference volume means to equalize and thereby establish a reference pressure, and said valve means being closed to isolate said reference pressure in said reference volume means;
    means for selectively establishing communication between said separate connection means and said operating volume means, thereby allowing said selected independently varying pressure and the reference pressure in said operating volume means to mix;
    and pressure responsive means communicating with said operating volume means and said reference volume means for measuring the difference between said mixed pressure and said reference pressure, said indicia means responding to said measured difference to indicate a pressure representative of the pressure in the selected fluid system.

2. A system for fast scanning of pressures as described in claim 1, wherein the several separate connection means have essentially equal volumes.

3. A system for fast scanning of fluid pressures as described in claim 1, wherein said pressure responsive means includes a first bellows and a second bellows disposed in opposition and mechanically connected to said indicia means, said first bellows forming a part of said operating volume means and said second bellows forming a part of said reference volume means.

4. A system for fast scanning of fluid pressures as described in claim 1, wherein each of said separate connection means has restriction means at each of said fluid systems to tend to isolate said fluid systems from said fast scanning system.

5. A system for fast scanning of fluid pressures as described in claim 1, wherein the means for selectively establishing communication between the separate connection means and said operating volume means comprise individual valve means disposed in each of said separate connection means.

References Cited

UNITED STATES PATENTS

| | | | |
|---|---|---|---|
| 616,604 | 12/1898 | Christian | 137—557 X |
| 1,797,591 | 3/1931 | Sartakoff | 73—420 |
| 2,247,089 | 6/1941 | Hopkins | 73—410 |
| 2,300,810 | 11/1942 | Robins | 73—410 |
| 2,547,377 | 4/1951 | De Juhasz | 73—396 |
| 2,840,109 | 6/1958 | Wadleigh | 73—420 X |
| 3,150,525 | 9/1964 | Berger | 73—407 |

LOUIS R. PRINCE, *Primary Examiner.*

DONALD O. WOODIEL, *Assistant Examiner.*